United States Patent [19]

Hammer et al.

[11] Patent Number: 5,458,833

[45] Date of Patent: * Oct. 17, 1995

[54] METHOD OF THERMAL TREATMENT OF MINERAL RAW MATERIAL

[75] Inventors: Thomas Hammer, Iserlohn-Letmathe; Heinzjosef Poggenpohl, Hagen-Halden; Rainer Prange; Herbert Richrath, both of Hagen; Alfred Roeder, Duisburg, all of Germany

[73] Assignee: Dolomitwerke GmbH, Wülfrath, Germany

[*] Notice: The portion of the term of this patent subsequent to Sep. 21, 2010 has been disclaimed.

[21] Appl. No.: 95,952

[22] Filed: Jul. 22, 1993

Related U.S. Application Data

[62] Division of Ser. No. 398,705, Aug. 25, 1989, Pat. No. 5,246,648.

[30] Foreign Application Priority Data

Aug. 26, 1988 [DE] Germany .............. 38 28 997

[51] Int. Cl.⁶ .................................................. C04B 35/04
[52] U.S. Cl. ................ 264/56; 264/37; 264/57; 264/64; 501/112; 501/113
[58] Field of Search ................ 264/56, 57, 37, 264/64; 501/112, 113

[56] References Cited

U.S. PATENT DOCUMENTS 4,394,454  7/1983  Rösener et al. .
4,626,198  12/1986  Cohen .
4,627,948  12/1986  Zepter et al. .
5,246,648  9/1993  Hammer ................................ 264/56

FOREIGN PATENT DOCUMENTS

| 66278 | of 1914 | Austria . |
|---|---|---|
| 1179692 | 12/1984 | Canada . |
| 564947 | 11/1932 | Germany . |
| 1014912 | 8/1957 | Germany . |
| 1078926 | 3/1960 | Germany . |
| 973947 | 11/1964 | Germany . |
| 260768 | 3/1968 | Germany . |
| 1646473 | 8/1971 | Germany . |
| 1646918 | 7/1972 | Germany . |
| 2203413 | 8/1972 | Germany . |
| 2553001 | 6/1977 | Germany . |
| 2558410 | 7/1977 | Germany . |
| 2819038 | 11/1979 | Germany . |
| 3828997 | 12/1989 | Germany . |

OTHER PUBLICATIONS

Wulfrather Pocketbook for Line and Dolomit, pp. 144–145.

*Primary Examiner*—James Derrington
*Attorney, Agent, or Firm*—Nils H. Ljungman & Associates

[57] ABSTRACT

Method for the production of sintered dolomite, wherein at least carbonate material is ground into particles, formed into a predetermined shape, such as briquettes, deacidified and then heated to a predetermined temperature.

18 Claims, No Drawings

METHOD OF THERMAL TREATMENT OF MINERAL RAW MATERIAL

This application is a Divisional Application of application Ser. No. 07/398,705 filed on Aug. 25, 1989, and patented as U.S. Pat. No. 5,246,648 on Aug. 21, 1993, which previous U.S. patent application claims priority from Federal Republic of Germany Patent Application P 38 28 997 filed on Aug. 26, 1988. Both the prior U.S. application and the Federal Republic of Germany Application were filed in the names of Thomas Hammer, Heinzjosef Poggenpohl, Rainer Prange, Herbert Richrath and Alfred Roeder, the inventors herein, and both previous application are assigned to the assignee of the present invention.

BACKGROUND OF THE INVENTION

1. Field of the Invention

The present invention relates to a process for the production of sinter dolomite, whereby primarily carbonate raw materials are ground, pressed into predetermined shapes, such as briquettes, and then sintered.

2. Description of the Prior Art

Sintered dolomite may serve as the refractory basic material for the production of basic refractory bricks. For the production of high grade refractory bricks, the sinter has, as primary requisites, a low amount of contamination from foreign oxides, for example, which is less than 3.5%, and a high density, for example, which is a raw density which is greater than 3.15 g/cm$^3$. The above-discussed procedure according to Austrian Patent No. 66278, essentially calls for the burning of magnesite which has been pre-deacidified in a rotary kiln. However, as discussed above, this procedure produces a very uneven sinter, due to the degree of burning and, therefore, cannot be used for the sintering of a dolomite which meets the above-mentioned requirements.

If one starts with raw dolomite gravel with a grain size between approximately 6 mm and 30 mm and heats it at a temperature which is greater than 2000° C., a raw density of the sinter dolomite of approximately 3.20 g/cm$^3$, with a contamination by foreign oxides of less than 3.5%, can be achieved. Raw materials, which can be sintered only with difficulty, will be deacidified only with a first burn such as that described in German Patent No. 31 18 481. After the first passage through the kiln, the raw material is then graded and compacted and is then sintered in a second passage through the kiln. In this procedure, the expenditure in energy is somewhat large because of the required high temperatures and the two stage burning. During the preparation of raw dolomite gravel, there are substantial amounts of raw dolomite sand with a grain size of less than 6 mm. It is not possible to compact the necessarily produced grains in a direct manner.

A further lowering of the lower size limit for the gravel is not permitted because of the otherwise increasing aerodynamic resistance of the fill at the Lepol grate which is, normally, attached to the rotary kiln and ahead of the entry to the kiln as recited, for example, in German Patent Publication for Opposition Purposes No. 16 46 918.

Furthermore, during the dust removal from the rotary kiln, a fine-grained filter dust is encountered which contains primarily oxides and has an upper limit of the grain spectrum of about 0.5 mm. This oxide filter dust can, however, be turned into briquettes and can be sintered, but the obtainable raw density of the sinter dolomite briquettes is too low since it is at a level of less than 3.10 g/cm$^3$. These residues, from the typical production methods of sinter dolomite from raw dolomite gravel, now has to be used in some other manner or else have to be disposed of.

German Laid Open Application No. 32 09 836 describes how to provide ground raw dolomite with additives and how to make briquettes which are then deacidified and sintered in a shaft kiln. It is possible to add additives in a planned fashion and to receive valuable sinter dolomite in one single move through the shaft or pit furnace. This procedure is limited to being performed in a shaft or pit furnace because of the brittle characteristics of the briquette. The briquettes have, at the temperature level at which a deacidification takes place, a very high porosity which can be up to 60%. The rotary kiln, by comparison to the shaft or pit furnace, has a higher mechanical or abrasive wear and tear. Briquettes could not be made from, primarily, carbonating raw materials because they would become destroyed. Even if one, as suggested in German Laid Open Patent Application No. 25 53 001, uses finely ground raw materials prepared by flotation and increases the press pressure for the formation of the mold, it is not possible to obtain a sinter raw density of greater than 3.2 g/cm$^3$ with dolomite. Even the procedure for the production of briquette sinter, according to German Patent No. 31 18 481, cannot succeed without the addition of additives to the raw dolomite.

OBJECTS OF THE INVENTION

An object of the invention is to increase the strength of the briquettes, thereby reducing brittleness prior to their delivery into a rotary kiln so that the procedure, described earlier, can be accomplished in a rotary kiln at a temperature up to 2000° C.

Another object of the invention is that a briquette-sintered dolomite, with a raw density of greater than 3.20 g/cm$^3$, can be achieved with the contamination of foreign oxides within the sinter dolomite being less than 3.5%.

SUMMARY OF THE INVENTION

The invention resides broadly in a method for the production of dolomite comprising the steps of providing material which includes at least a carbonate material, grinding the material into particles, forming a group of the particles into a predetermined shape, applying a deacidizing process to the shaped group of particles and heating the shaped group of particles.

It is advantageous that, with raw materials that are ground very fine, the percent of grains with a grain size of less than 0.09 mm be more than 70%. This will achieve a homogenization of the raw materials and a high, raw density of the sinter briquettes.

It is, furthermore, advantageous that the briquettes be heated to a temperature of at least 1000° C. prior to their delivery into the rotary kiln. That is at least 100° C. above the temperature required for the complete deacidification of calcium carbonites. Therefore, with the use of carbonate raw materials, a strength of the briquettes is being achieved so that they virtually do not get destroyed in the rotary kiln.

Raw dolomite or a mixture of raw dolomite with raw magnesite and/or calcite can be used as the raw material. A change of the MgO-CaO ratio can be obtained depending on the use. Bonding agents, such as oxides and/or hydroxides of calcium and/or magnesium, can be added to the raw materials. As an addition, oxide filter dust can also be used.

It is especially advantageous to grind the components of the raw material together. It has been found that the process of combined grinding results in the achievement of a higher raw density sinter, compared to a separate grinding and subsequent mixture of the components.

An advantageous development of the invention can consist in the fact that raw dolomite sand, with a grain size of less than 6 mm, can be mixed with an oxide filter dust and the combined mixture can be finely ground. Through this procedure, it is possible to utilize the residue from the customary production of sinter dolomite from raw dolomite gravel within a rotary kiln for the production of a very valuable briquette-sintered dolomite.

With the procedure according to the invention, it is furthermore possible to utilize finely ground raw materials in a rotary kiln as the initial or basic substance.

The economic advantage of the production of briquette-sintered dolomites in a rotary kiln consists generally of the fact that a rotary kiln has a much higher charge per kiln unit. By contrast, the shaft or pit furnace can only hold a limited charge. The advantage of smaller specific consumption of energy by the shaft or pit furnace is therefore overcompensated.

A preferred embodiment of the invention will be described with respect to, but is not limited to, the following example of the joint process of gravel and fine raw materials which have been processed into briquettes.

DESCRIPTION OF THE PREFERRED EMBODIMENTS

The rotary kiln installation consists of a rotary kiln which is approximately 110 meters long and is slightly inclined and which has a diameter of approximately 4.4 meters. Located in front of the rotary kiln is a Lepol grate which is provided for the purpose of deacidizing the raw stones. Beyond the rotary kiln, there is a thrust grating cooler.

A mixture consisting of dust from bituminous coal and lignite coal is burnt at a temperature of between 1800° C.–2000° C., since at least that temperature is required for the sintering to be achieved within the rotary kiln. The hot exhaust gases leaving the rotary kiln are sucked from below through the fill on the Lepol grate by means of blowers which have electrostatic precipitation filters. In the discharge side of the grate, shortly before the infeed side of the rotary kiln, the fill reaches a bed temperature up to 1300° C. through the employment of an auxiliary fire, so that the deacidification of the raw material is, practically, concluded. The grain arriving at the Lepol grate is of a dimension from 6 mm to 32 mm. Judged by a customary operating level, the charge of gravel consists of 60 t/h, which corresponds to sinter performance of approximately 30 t/h.

The relative composition of the raw material, which may be substantially unprocessed dolomite sand, is as follows:

| | |
|---|---|
| CaO | 61.0% |
| MgO | 37.5% |
| SiO | 0.5% |
| $Fe_2O_3$ | 0.6% |
| $Al_2O_3$ | 0.3% |
| $Mn_3O_4$ | 0.1% |

The annealing loss varies considerably between the raw dolomite sand and the oxide filter dust. The annealing loss of the carbonate raw dolomite sand is approximately 47% because of the high $CO_2$ content and the annealing loss of the oxide filter dust is approximately 10% because of its residual $CO_2$ and $H_2O$.

The first step of the process of the invention entails the raw dolomite sand and the oxide filter dust to be both mixed in a bowl-shaped or ball mill, and ground. The mass relationship is 10 to 40 parts oxide filter dust to 90 to 60 parts raw dolomite sand and, preferably, 30 parts oxide filter dust to 70 parts raw dolomite sand. After the joint grinding, the contents of the raw powder mixing, in terms of grain size, contain at least 75% of grains with a size of less than 0.09 mm.

In the second step, the raw mixture is pressed or formed into a predetermined shape, such as briquettes, by a briquette press, with a cycle for the remainder which are below 10 mm. The net performance of the press is approximately 10 ton of green briquettes per hour. The briquettes have a pillow form and a volume of approximately 10 cubic centimeters.

The third step includes deacidification and sintering. Here, the green briquettes are moved evenly by a conveyor over the Lepol grate to the rotary kiln. The briquettes cover the fill of the Lepol grate and may be heated to a temperature above 1200° C.. They are then deacidified and the strength is increased to a point that the briquettes will not be destroyed later on in the rotary kiln. The sintering within the rotary kiln takes place at a temperature of approximately 2000° C.

The briquette-sintered dolomite produced according to the above mentioned examples, done with both sinter dolomite and raw dolomite gravel, has a raw density of 3.28 $g/cm^3$ with a contamination of foreign oxides of about 2.5% of proportion of mass and a porosity of about 4.2% portion of volume.

In summing up, the procedure for the production of sintered dolomite, in which procedure primarily carbonate raw materials are ground, pressed into briquettes, and are subsequently sintered, is characterized by the fact that (a) the raw material is ground very fine, and (b) briquettes are formed which (c) are entered through a deacidizing device and are environmentally safely heated to a calcination temperature before they enter the rotary kiln.

The procedure is characterized by the fact that the raw material has been ground very fine and that the share of granulars with a granular size of less than 0.09 mm consists of more than 70%.

The procedure has been characterized by the fact that the briquettes will be heated to a temperature of at least 1000° C. before they are entered into the rotary kiln.

The procedure is characterized by the fact that the raw material used consists of raw dolomite or a mixture of raw dolomite with raw magnesite and/or calcite.

The procedure is characterized by the fact that the raw material receives additions of oxides and/or hydroxides of calcium, and/or magnesium.

The procedure is characterized by the fact that oxide filter dust is used as an additive.

The procedure is characterized by the fact that all components of the raw material are jointly mixed.

The procedure is characterized by the fact that the raw dolomite sand with a granular size less than 6 mm is mixed with oxide filter dust and are both ground together finely.

Patents relating to the production of sintered dolomite in a rotary kiln include U.S. Pat. No. 4,193,556, entitled "Hammer Mill", and U.S. Pat. No. 4,626,198, entitled "Method and Apparatus For Producing Dead Burnt Materials."

All patents, patent applications, publications and/or documents recited herein are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A method of thermal treatment of raw carbonate material to produce sintered dolomite, said method comprising the steps of:

grinding said raw carbonate material into particles;

forming groups of said carbonate material particles into predetermined shapes;

heating initially said shaped groups of particles in a first heating stage to deacidize and strengthen said shaped groups of particles;

moving said shaped groups of particles evenly during said initial heating; and further heating the shaped groups of particles in a second heating stage in a rotary kiln to produce sintered shaped groups of particles.

2. The method according to claim 1, wherein said further heating in said second heating stage comprises heating said shaped groups of particles to a substantially higher temperature than said initial heating of said shaped groups of particles in said first heating stage.

3. The method according to claim 2, wherein said moving of said shaped groups of particles evenly during said initial heating comprises moving said shaped groups of particles evenly by a conveyor.

4. The method according to claim 3, wherein said grinding comprises grinding said raw carbonate material to particles having a dimension, the dimension of at least a portion of said particles being about less than 0.09 millimeters.

5. The method according to claim 4, wherein said at least a portion of said particles comprises greater than 70% of said particles.

6. The method according to claim 5, wherein said forming of groups of said particles into a predetermined shape comprises pressing said particles into a briquette.

7. The method according to claim 6, wherein said method further includes the steps of:

adding at least one bonding agent to said carbonate material, said at least one bonding agent for bonding the carbonate material; and grinding said at least one bonding agent and said mineral raw material together to form a mixture of particles.

8. The method according to claim 7, wherein:

said raw material includes a member selected from the group consisting essentially of: a) dolomite, b) magnesite, c) calcite, and d) combinations of members of the group; and said at least one bonding agent comprises a member selected from the group consisting of: a) calcium oxide, b) calcium hydroxide, c) magnesium oxide, d) magnesium hydroxide, and e) combinations of members of the group.

9. The method according to claim 8, wherein said initial heating comprises heating said shaped groups of particles to at least about 1000° C. to deacidize and calcine said shaped groups of particles to strengthen said shaped groups of particles before introducing said shaped group of particles into the rotary kiln.

10. The method according to claim 9, wherein said heating in the rotary kiln comprises heating said deacidized shaped groups of particles to a temperature of at least 1800° C. in the rotary kiln.

11. The method according to claim 10, wherein said oxide is dust filtered from said heating means, said dust containing oxides.

12. The method according to claim 10, wherein said raw carbonate material comprises substantially unprocessed dolomite sand of grain sizes of less than 6 millimeters and dust filtered from said rotary kiln, said dust containing an oxide.

13. A method for the thermal treatment of a carbonate raw material to produce sintered dolomite, said method comprising:

providing at least carbonate raw material;

grinding at least said carbonate raw material to produce reduced size particles of said carbonate raw material;

pressing groups of the reduced size particles into predetermined shapes;

moving said shaped groups of particles evenly through a first heating stage whereby movement between said shaped groups of particles is minimized during said moving;

heating said shaped group of particles in said first heating stage to deacidize and strengthen said shaped groups of particles; and further heating said strengthened shaped groups of particles in a second heating stage, said second heating stage comprising heating in a rotary kiln.

14. The method according to claim 13, further including:

prior to said grinding, adding at least one bonding agent to said carbonate raw material, said bonding agent for bonding said carbonate raw material;

grinding together said carbonate raw material and said at least one bonding agent to form a mixture of reduced size particles of the bonding agent and said carbonate raw material;

deacidizing said shaped groups of particles in said first heating stage by heating said shaped groups of particles to at least about 1000° C.; and heating said deacidized shaped groups of particles to a temperature of at least about 1800° C. in said second heating stage.

15. The method according to claim 14, wherein:

said grinding together comprises grinding each of said carbonate raw material and said at least one bonding agent to particles having a dimension, the dimension of at least 70% of said particles being less than about 0.09 millimeters;

said grinding comprises grinding in at least one of: a bowl shaped mill and a ball mill;

said pressing of groups of said particles into predetermined shapes comprises pressing said groups of particles into a briquette having a volume of about 10 cubic centimeters;

said carbonate raw material includes a member selected from the group consisting essentially of: a) dolomite, b) magnesite, c) calcite, and d) combinations of members of the group;

said at least one bonding agent comprises a member selected from the group consisting of: a) calcium oxide, b) calcium hydroxide, c) magnesium oxide, d) magnesium hydroxide, and e) combinations of members of the group;

said oxide is dust filtered from said heating means, said dust containing oxides;

said carbonate raw material has a grain size of less than 6 millimeters;

said deacidizing comprises deacidizing said shaped group of particles on a grate;

said heating in said rotary kiln comprises heating in a rotary kiln having length of about 110 meters and a diameter of about 4.4 meters;

said process further comprises cooling said heated shaped groups of particles from said rotary kiln on a thrust grating cooler; and said adding at least one bonding agent to said at least a carbonate material comprises adding about 10 to about 40 parts oxide filter dust to about 90 to about 60 parts of raw dolomite sand.

16. A method for the thermal treatment of a carbonate raw material to produce sintered dolomite, said method comprising:

providing materials which include at least a carbonate raw material and at least one bonding agent component for bonding said at least a carbonate raw material, said at least one bonding agent component comprising at least one member selected from the group consisting of: oxides of calcium, oxides of magnesium, hydroxides of calcium, hydroxides of magnesium, oxide filter dust, and combinations of members of the group;

grinding together said at least a carbonate raw material component and said at least one bonding agent component to produce reduced size particles of a mixture of said at least a carbonate raw material component and said at least one bonding agent component;

forming a group of the reduced size particles into a predetermined shape;

deacidizing said shaped group of particles in deacidizing apparatus to calcine said shaped group of particles and strengthen said shaped group of particles; and heating said deacidized shaped group of particles in a rotary kiln.

17. The method according to claim 16, further including:

prior to said strengthening in said deacidizing apparatus, moving the shaped groups of particles evenly at least to said deacidizing apparatus;

deacidizing said shaped groups of particles by initially heating said shaped groups of particles to at least about 1000° C.; and heating said deacidized shaped groups of particles to a temperature of at least about 1800° C. in the rotary kiln.

18. The method according to claim 17, wherein:

said moving of said shaped groups of particles at least to said deacidizing apparatus comprises moving said shaped groups of particles evenly by conveyor to said deacidizing apparatus;

said grinding together comprises grinding said at least a carbonate material and said bonding agent to particles having a dimension, the dimension of at least 70% of said particles being about less than 0.09 millimeters;

said forming a group of said particles into a predetermined shape comprises pressing said particles into a briquette having a volume of about 10 cubic centimeters;

said at least a carbonate material includes a member selected from the group consisting essentially of: a) dolomite, b) magnesite, c) calcite, and d) combinations of members of the group;

said at least a carbonate raw material comprises an unprocessed dolomite sand of a grain size of less than 6 millimeters;

said deacidizing comprises deacidizing said shaped group of particles at a grate;

said heating in said rotary kiln comprises heating in a rotary kiln having length of about 110 meters and a diameter of about 4.4 meters;

said process further comprises cooling said heated shaped group of particles from said rotary kiln on a thrust grating cooler; and said at least one bonding agent and said at least a carbonate material are in a proportion of about 10 parts to about 40 parts oxide filter dust to about 90 parts to about 60 parts of raw dolomite sand.

* * * * *